May 5, 1936.   I. HECHENBLEIKNER   2,039,645
TREATMENT OF SULPHUR BEARING ORES
Filed Oct. 4, 1932
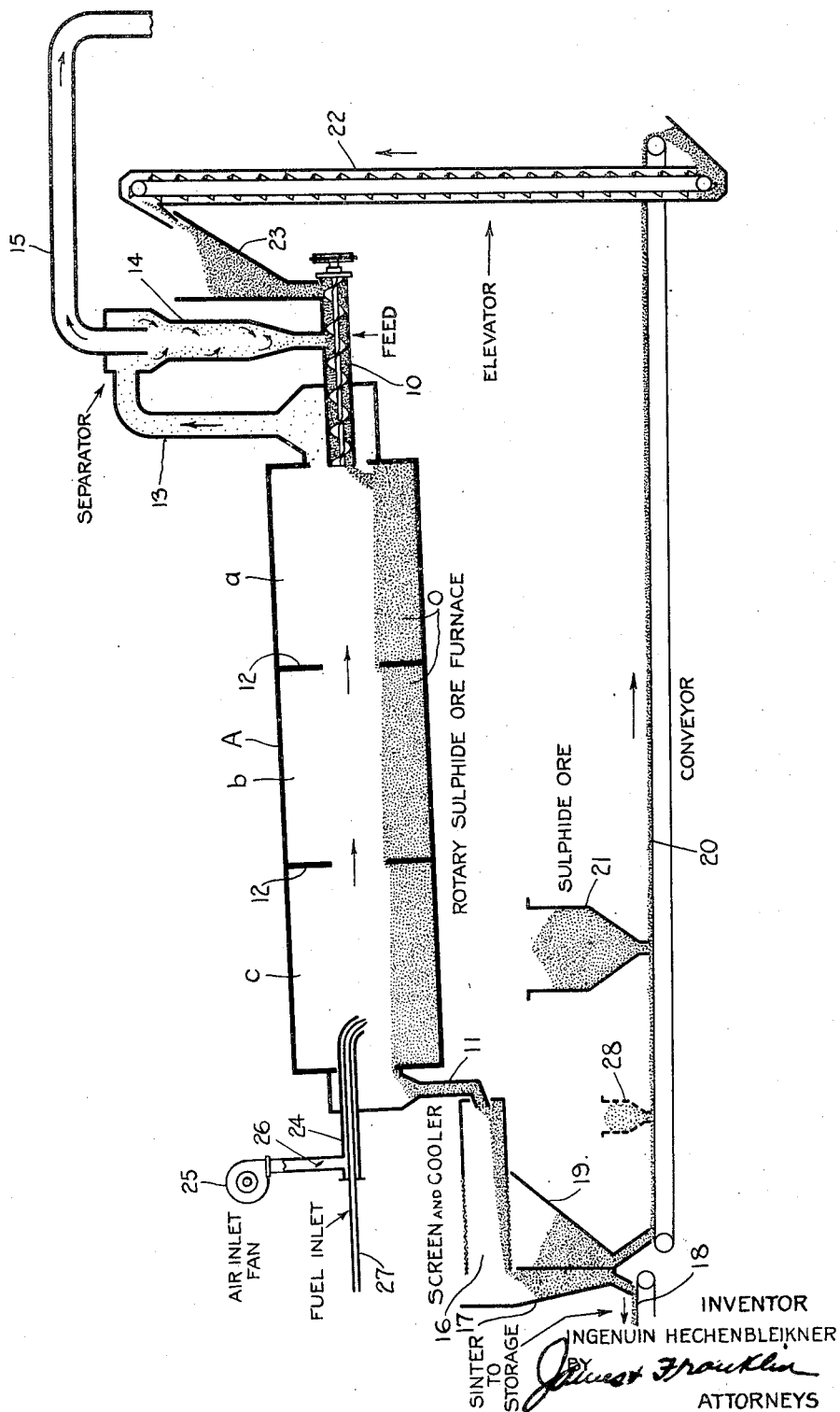
INVENTOR
INGENUIN HECHENBLEIKNER
ATTORNEYS Patented May 5, 1936

2,039,645

UNITED STATES PATENT OFFICE 2,039,645

TREATMENT OF SULPHUR BEARING ORES

Ingenuin Hechenbleikner, Charlotte, N. C., assignor to Chemical Construction Corporation, Charlotte, N. C., a corporation of Delaware Application October 4, 1932, Serial No. 636,141

7 Claims. (Cl. 75—7)

This invention relates to an improved method of treating sulphur bearing ores to desulphurize the same and to produce therefrom sulphur dioxide gas and an oxide of the metal of the ore.

Prime desiderata in the desulphurizing and roasting of sulphur bearing ores such as pyrites, pyrhotite, zinc concentrate and the like are the production of a sulphur dioxide gas of high concentration suitable, for example, for the economical production of sulphuric acid or for the making of calcium bisulphite for the sulphite wood pulp industry, and the production of a so-called "dead roasted" ore consisting of a metal oxide suitable for direct use in smelting operations of blast furnaces and iron and steel reproducers. Many methods have heretofore been devised and suggested for accomplishing one or the other or even both of these desired results; and to solve the numerous difficulties involved, it has heretofore been proposed in different methods to roast the ore with carbon or hydrocarbons added thereto to control the supply and strength of oxygen (either in the form of air or in a more concentrated form) in the roasting step, and to dilute the oxygen (air) with non-oxidizing gases such as the sulphur dioxide obtained in the process, these methods being carried out in various types of furnaces, such as the Wedge and Herreshoff furnaces and also furnaces of the rotary kiln type.

In spite of the numerous suggestions made and the many methods devised, it has not heretofore been found possible or practicable, so far as I am aware, to regulate or control the roasting reactions in the furnace to produce in any simple and economical way a sulphur dioxide gas of high concentration on the one hand and a "dead roasted" ore consisting of a metal oxide having a very low sulphur content on the other hand, which latter may, if desired, be properly sintered or nodulized in the roasting process without interfering with the roasting reactions taking place.

The prime object of my present invention aims at the provision of an improved method for roasting sulphur bearing ores, such for example as iron and zinc sulphide, to produce therefrom an $SO_2$ gas of high concentration and a metal oxide having a very low sulphur content which, if desired, may be granulated, sintered or nodulized in the process, the method being capable of being carried on in a continuous way, with the roasting reactions under ready and facile control of the operator, the process being further capable of producing uniform resulting products and by uniform operation.

The successful roasting of sulphur bearing ores to accomplish the ends sought for is beset with many difficulties. The strength of the resulting $SO_2$ gas depends mainly upon the oxygen content used in the roasting process, the combustion gases present (where carbon or hydrocarbons have been mixed with the ore) and the presence of contaminating gases such as sulphur trioxide ($SO_3$) which are incidentally and undesirably generated in the roasting operation. The character of the metal oxide produced depends upon the temperature, time, degree of oxidation and general control of the roasting reactions. Where oxygen of higher concentration than that contained in air was used in prior processes, to produce $SO_2$ gas of increased strength, difficulties arose due to the increased rate of combustion and high furnace temperatures. Where the rate of flow of the air was sought to be controllably reduced to obtain the high strength of $SO_2$, the regulation of the temperatures in the furnace nevertheless proved difficult and so far as I am aware, it was not feasible or possible to obtain an $SO_2$ gas free from contamination with $SO_3$ or to obtain a sufficiently desulphurized metal oxide or one which was properly granulated as distinguished from being matted or coagulated. Where a diluent gas for the air or oxygen such as $SO_2$ or $CO_2$ was suggested, for the purpose of checking the rate of combustion in the roasting furnace, or where this was combined with an attempted regulation of the oxygen content, it was still difficult to prevent the formation of the trioxide of sulphur or to effect that completion of the oxidation desired to produce a properly granulated and desulphurized metal oxide. Where the process was carried out in a rotary kiln, various means had to be adopted in an endeavor to regulate the course of the roasting reaction; these prove, however, difficult of accomplishment and do not anyway yield the desired results.

By the practice of the process of my present invention, I am enabled (1) to produce $SO_2$ gas of high concentration substantially free of $SO_3$ gas, (2) to produce an oxide of the metal having a very low sulphur content such for example as 1% and even as low as 0.1%, (3) to produce a metal oxide which is granulated or sintered in the process which may, without further processing, be used in the blast furnaces, (4) to carry out the process in a continuous operation in a rotary kiln, (5) to produce uniformity in resulting products, (6) to provide for easy and convenient control of the factors of reaction such as the time and temperature of reaction and the flow or movement of the reacting constituents, (7) to effectively dispose of the dust formed in the process whereby the $SO_2$ gas obtained is substantially free from dust contamination and (8) to provide a method readily adaptable to the treatment of ores of different metals and different ores of the same metal.

To the accomplishment of the foregoing and such other objects as will, hereinafter appear, my invention consists in the method and the steps of the method as hereinafter more particularly described and sought to be defined in the claims; reference being had to the accompanying drawing, which show an apparatus preferably used in the practice of the method, and in which:

The figure is a diagrammatic view of a rotary kiln or furnace and associated equipment.

I have found that the objects of my present invention may be successfully achieved by properly governing both the magnitude or degree of the temperatures developed in the roasting operation and the distribution or zoning of the temperatures along the length of the roasting furnace. This I accomplish by controlling the flow of air and the flow of ore through the furnace, which latter is preferably a rotary kiln, the control being such as to produce a roasting atmosphere in the kiln having a preferably continuously increasing temperature gradient which increases in the direction of the ore flow, and being further such that there takes place in the lower temperature stage of the roasting operation an oxidation of the ore in an atmosphere critically low in free oxygen and in the higher temperature stage of the roasting operation a completion of the oxidation of the ore in an atmosphere having a substantial amount of free oxygen. By thus controlling the air flow an $SO_2$ gas of high concentration is produced. By carrying out the first stage of the roasting operation in an atmosphere low in free oxygen and the second stage in an atmosphere having a substantial amount of free oxygen, the formation of $SO_3$ is avoided or prevented because of the lack of available oxygen in the first stage, even though the temperatures therein are within the range of catalytic or $SO_3$ formation temperatures, and because the temperatures in the second stage are above such catalytic temperatures, even though there is an available supply of free oxygen in this second stage.

In the present embodiment of the invention, the degree and distribution of the furnace temperatures are further controlled by admixing with the ore an oxide of the metal of the ore and preferably a part of the metal oxide produced in the process which is re-circulated with the ore in the roasting kiln. The high degree of desulphurization and the obtaining of a granulated and sintered product thereby results. In the process the rate of roasting reaction and the temperature distribution are also controlled by the depth of the ore bed in the kiln, the rate of flow of the ore through the kiln and the proportion of commixture of ore and the metal oxide. The kiln is operated with only one point of supply for the ore and one point of supply for the oxygen, these being admitted at opposite ends of the kiln and circulated through the kiln in countercurrent directions. There results a simple control and operation and a thorough treatment of the ore.

Referring now to the drawing, the roasting operation is preferably practised in a rotary kiln A into one end of which the ore or admixture is charged by means of a screw conveyor 10, and from the other end of which the solid residue of the treatment (the oxide of the metal) is discharged through a hopper 11. The rotary kiln is designed to carry a substantially deep bed of the ore O under treatment. The roasting operation is subdivided into a plurality of stages forming in sequence one continuous operation; and this subdivision may, I have found, be efficiently accomplished by subdividing the rotary kiln into a number of compartments by means of annular partitions 12, 12, three or four compartments being preferred.

The $SO_2$ gas produced in the process having a strength of about 12% (when treating pyrites or zinc concentrates) flows from the kiln through an exit flue 13, the separator 14, and into a pipe 15 and thence directly to a sulphuric acid producing system (where it is desired to produce sulphuric acid) such as set forth in my copending applications Serial No. 575,549, filed November 17, 1931, or Serial No. 619,054, filed June 24, 1932. The ore or ore admixture O continuously feeds through the kiln, the iron oxide product is continuously discharged therefrom, and the $SO_2$ gas is continuously withdrawn from the kiln. Any dust formed in the process is separated by the air currents produced in the separator 14 and is deposited into the ore feed screw conveyor 10.

The granulated metal oxide discharging from the hopper 11 feeds to a screen and cooler 16 which functions to separate or screen the nodulized or sintered part of the metal oxide from the unsintered part, the sintered part falling into a hopper section 17 from which it is conveyed by means of a conveyor 18 to storage, and the unsintered part falling into a hopper section 19 from which it feeds onto a conveyor 20. The sulphide ore to be treated may be contained in a hopper 21 which also feeds onto the conveyor 20, and the admixture of metal oxide and ore is conveyed to an elevator 22 and thence into the feed hopper 23. The air supply is admitted to the metal oxide discharge end of the kiln through a conduit 24 and by means of a blower 25, the flow being controlled by a damper 26, the air flowing through the kiln countercurrent to the ore flow therein. The air conduit 24 may also be provided with a fuel inlet 27, which fuel may be used in starting up the furnace, and which may also be used for other purposes, as hereinafter described.

The reactions taking place in the kiln require a substantial amount of time for completion, and it is therefore desirable to maintain a substantially deep bed of the roasting mixture in the kiln, this being controlled by the height of the partition walls 12 and the end walls of the kiln, as well as by the speed of movement of the ore through the kiln. The mechanical condition of the metal oxide product is also controlled by the rate of feed of the roasting mixture, as well as by the kiln temperatures. The heat regulates the sintering or nodulizing of the product, and this combined with the time of reaction regulates the degree of desulphurization taking place.

The following example of the use of the complete process will serve to illustrate the preferred manner of practising the same. To each 100 pounds of sulphide ore (such as iron pyrites, pyrhotite, zinc concentrates, etc.) fed from the hopper 21 onto the conveyor 20, 300 pounds of the metal oxide from the hopper 19 is fed onto the conveyor, it having been found that the general proportions of 25% of the fresh ore to 75% of the metal oxide in a rotary kiln 12 feet in length and 3 feet in diameter yields the best results. The air flow into the kiln is controlled so that the free oxygen content of the produced SO₂ gases does not exceed 5%, and may be from 1 to 5% (being most generally around 2 to 3%).
The exit temperatures of the SO₂ gas may be from 300° to 500° F. where at least part of the metal oxide is re-circulated through the kiln, or may be higher where part of the SO₂ product is re-circulated through the kiln, as described in my companion application filed concurrently herewith, Serial No. 636,142. The sintering or nodulizing is carried out so as to produce a sintered product of from 15 to 25% of the total residue discharging from the kiln. The kiln compartments are provided with flights (not shown) which function to elevate the ore mixture in the rotation of the kiln, thereby effecting a more intimate mixture of the ingredients in the kiln and preventing caking or matting of the product;
the use of which flights also increases the capacity of the roasting process. Preferably no flights are provided in the ore feed chamber $a$ of the kiln; by not equipping the flights in this chamber $a$, the said chamber is made to act incidentally as a dust settling chamber, which chamber also functions mainly as a preheating chamber. Where four compartments are provided, the end compartment $c$ need not be equipped with flights, since it is found that the absence thereof assists to some extent in nodulizing the product.

The process is controlled so as to make about the middle region of the end chamber $c$ of the kiln the hottest end of the kiln, whereby a continuously increasing temperature gradient increasing in the direction of the ore flow is produced. This temperature gradient may range, in the embodiment herein described, from 300° F. in the chamber $a$ to 2000° F. in the hottest region of the chamber $c$. The air as it moves through the kiln becomes gradually depleted in available free oxygen, the chamber $c$ having a substantial supply thereof whereas the chamber $a$ is critically low in free or excess oxygen. This air control combined with the admixture of the ore with the metal oxide and the controlled flow thereof yields an atmosphere in chambers $a$ and $b$ which, because of the depleting oxygen content, is not conducive to catalytic conversion of SO₂ to SO₃ or SO₃ formation in spite of the favorable catalytic temperatures therein, and yields temperatures in the region of chamber $c$ adjoining chamber $b$ which are above the catalytic or SO₃ formation temperatures, although the amount of oxygen therein would otherwise be favorable to SO₃ formation. In the exit region of chamber $c$ there is a drop in temperature; but here, due to the absence of sulphur, there will be no formation of SO₃ regardless of the high oxygen content or the temperature. Where four instead of three compartments are provided, the kiln is so subdivided that the hottest region of the kiln may be in the second compartment from the residue exit end of the kiln and thus in the compartment corresponding to compartment $b$. In such case the temperature gradient progressively increases over the length of three compartments. The sulphide ores used may contain from 35 to 45% sulphur, and it is found that the desulphurization may be carried on to such an extent that the metal oxide product produced has a sulphur content as low as from 0.1 to 0.3%.

To reduce any sulphates which may be contained in the ore, and also to obtain a hard sintered product whenever desired, a small proportion of powdered coke or coal, such for example as one-half of 1% by weight of the ore mixture, may be added to the ore mixture; and this may be fed from a hopper 28 onto the conveyor 20. Additional fuel (fuel inlet 27) may be used whenever a hard sintered product is desired and may also be used to return to the discharge chamber $c$ of the kiln the high temperature zone when it tends to move to the middle chamber $b$. In the absence of the employment of either additional carbon or additional fuel, the carbon dioxide content of the produced gases is nil; and whenever some additional fuel is employed, the CO₂ content is negligible. The metal oxide which is returned to the kiln for recirculation therein is cooled in transit, with the result that the exiting SO₂ gas is substantially cool, this being an important factor where the SO₂ gas is led to a condensing system of the type above referred to. When the fresh ore is wet, the addition thereto of the metal oxide coming from the kiln dries the fresh ore thoroughly before it is fed into the kiln. It is found that the re-circulation of the roasted ore does not reduce the capacity of the kiln.

The manner of practising the improved process of my present invention and the many advantages thereof will in the main be fully apparent from the above detailed description thereof. The production of the SO₃-free SO₂ gas of high concentration and the metal oxide of very low sulphur content, as well as the obtaining of the other advantages set forth, results from the described governing or control of both the magnitude or degree of the temperatures developed in the roasting operation and the distribution or zoning of these temperatures along the length of the roasting furnace. The low temperatures at the gas exit end of the kiln not only favor the avoidance of SO₃ generation, but result in a low exit temperature for the SO₂ gases. If any SO₃ is generated at the high temperature zone of the kiln, it is reduced in its transit through the lower temperature regions of the kiln so that the exit gases are free of SO₃ as described. The temperature control in and the practice of the process is such that the roasting may be and is carried on at the higher temperatures to effect substantially complete desulphurization of the ore with the obtaining of a granulated metal oxide and with the avoidance throughout the process of that matting, coagulation or fusion of the ore which characterizes prior roasting methods also aiming at substantially complete desulphurization of the ore. The high concentration, low temperature, SO₃-free character and the low oxygen content of the SO₂ gases produced are very important in enabling the produced gas to be utilized directly for making contact sulphuric acid without the expensive equipment for purification, mist removal and treatment of large gas volumes used in prior contact plants; it being thus now made possible to build a complete plant for making contact sulphuric acid at a cost very considerably lower than that heretofore possible with other methods.

While I have specified a range of temperatures within which it is possible to work the apparatus described, it will be understood that this range of temperatures may be widely varied, the temperature limits being interrelated with variations in ore composition, size or capacity of the plant, amount of re-circulated ore or gas and the amount of free oxygen used. While I have mentioned the use of iron and zinc sulphide ores for the process, it will be understood that I am able to employ in the kiln all grades of ores from the low grade sulphur sands to high grade concentrates, either iron, copper, lead or zinc. All of these can be used without the use of water cooled equipment and without caking or matting of the mass taking place. I have found that excellent efficiency in complete extraction of the sulphur is had without the use of supplementary heat or carbonaceous material, these being employed only to assist in producing a hard sintered or nodulized product. In prior art roasting processes, external heat supplemental to that yielded by the sulphur content of the ore is used; and this supplemental heat is usually obtained by the carbon or hydrocarbons added to the ore. The present process may be and is preferably practiced as stated without the use of supplementary heat or carbonaceous material, even though the resultant ore treated in the kiln has a relatively low sulphur content, the manner of carrying out the process together with the low temperatures employed over a region of the kiln, the high concentration of the gases obtained and the insulation provided for the kiln being factors in effecting and permitting that heat conservation which permits the practice of the process without the additional fuel. The granulated product of the kiln discharges therefrom in a continuous and easy flowing stream.

While I have described the process and apparatus to be used therefor showing the practice of the steps in the preferred manner, it will be apparent that I may make many changes and modifications therein without departing from the spirit of the invention, defined in the following claims.

I claim:

1. The process of treating sulphur bearing ores to desulphurize the same and to produce therefrom sulphur dioxide gas and a metal oxide, part of which is sintered and part is unsintered, which consists in admixing with the ore at least a part of the unsintered metal oxide of the ore substantially in the proportions of 25% of the ore and 75% of the oxide, in circulating the admixture in a continuous roasting operation through a roasting atmosphere and in flowing oxygen through the roasting atmosphere.

2. The process of treating sulphur bearing ores to desulphurize the same and to produce therefrom sulphur dioxide gas and a metal oxide, which consists in slowly circulating the ore in a continuous roasting operation through a roasting atmosphere, in re-circulating the produced metal oxide through the roasting atmosphere in admixed relation with the ore, in flowing oxygen through the roasting atmosphere, and in controlling the flow of the admixture and the flow of the oxygen whereby there takes place in the low temperature stage of the roasting operation an oxidation of the admixture in an atmosphere low in free oxygen and in the high temperature stage of the roasting operation a completion of the oxidation of the admixture in an atmosphere having a substantial amount of free oxygen, the resulting $SO_2$ gas being substantially free from $SO_3$.

3. The process of treating sulphur bearing ores to desulphurize the same and to produce therefrom sulphur dioxide gas substantially free from $SO_3$ and a metal oxide having a very low sulphur content, which consists in slowly circulating the ore in a continuous roasting operation through a roasting atmosphere having a continuously increasing temperature gradient which increases in the direction of the ore flow, in re-circulating produced metal oxide through the roasting atmosphere in admixed relation with the ore, in flowing oxygen through the roasting atmosphere countercurrent to the flow of the admixture, and in controlling the flow of the admixture and the flow of the oxygen whereby there takes place in the low temperature stage of the roasting operation an oxidation of the admixture in an atmosphere low in free oxygen and in the high temperature stage of the roasting operation a completion of the oxidation of the admixture in an atmosphere having a substantial amount of free oxygen, the resulting $SO_2$ gas being substantially free from $SO_3$.

4. The process of treating sulphur bearing ores to desulphurize the same and to produce therefrom sulphur dioxide gas and a metal oxide, which consists in slowly circulating the ore through a rotary kiln in a continuous roasting operation, the roasting atmosphere in the kiln having a temperature gradient which increases in the direction of the ore flow, in re-circulating at least a part of the produced metal oxide through the kiln in admixed relation with the ore, in flowing oxygen through the kiln and in controlling the flow of the admixture and the flow of the oxygen whereby there takes place in the low temperature stage of the roasting operation an oxidation of the admixture in an atmosphere critically low in free oxygen and in the high temperature stage of the roasting operation a completion of the oxidation of the admixture in an atmosphere having a substantial amount of free oxygen, the resulting $SO_2$ gas being substantially free from $SO_3$.

5. The process of treating sulphur bearing ores to desulphurize the same and to produce therefrom sulphur dioxide gas substantially free from $SO_3$ gas and a sintered metal oxide having a sulphur content less than 1%, which consists in slowly circulating a substantially deep bed of the ore in a rotary kiln in a continuous roasting operation, the roasting atmosphere in the kiln having a temperature gradient which increases in the direction of the ore flow, in re-circulating at least a part of the produced metal oxide through the roasting atmosphere in admixed relation with the ore, in admitting oxygen at one end of the kiln and flowing the same through the kiln, and in controlling the flow of the admixture and the flow of the oxygen whereby there takes place in the roasting stage at or below catalytic or $SO_3$ formation temperatures an oxidation of the admixture in an atmosphere low in free oxygen and in the roasting stage above such temperatures a completion of the oxidation of the admixture in an atmosphere having a substantial amount of free oxygen, the $SO_2$ gas produced having a free oxygen content of no greater than 5% and being substantially free from $SO_3$, the completion of the oxidation being carried out to produce a sintering or nodulizing of the metal oxide.

6. The process of treating sulphur bearing ores to desulphurize the same and to produce therefrom sulphur dioxide gas and a metal oxide, which consists in slowly flowing the ore in a continuous roasting operation through a roasting atmosphere having a temperature gradient which increases in the direction of the ore flow, in flowing oxygen to the roasting atmosphere and in controlling the flow of ore and the flow of oxygen whereby there takes place in the low temperature stage of the roasting operation an oxidation of the ore in an atmosphere low in free oxygen and in the high temperature stage of the roasting operation a completion of the oxidation of the ore in an atmosphere having a substantial amount of free oxygen, said operation being conducted in the presence of a relatively large amount of finely divided oxide produced in a previous operation, to avoid the presence of $SO_3$ in the resulting gas.

7. The process of treating sulphur bearing ores to desulphurize the same and to produce therefrom sulphur dioxide gas and a metal oxide, which consists in slowly flowing the ore in a continuous roasting operation through the roasting atmosphere having a temperature gradient which increases in the direction of the ore flow, in flowing oxygen to the roasting atmosphere and in controlling the flow of ore and the flow of oxygen whereby there takes place in the low temperature stage of the roasting operation an oxidation of the ore in an atmosphere low in free oxygen and in the high temperature stage of the roasting operation a completion of the oxidation of the ore in an atmosphere having a substantial amount of free oxygen, said operation being conducted in the presence of a relatively large amount of finely divided oxide produced in a previous operation, to avoid the presence of $SO_3$ in the resulting gas, said gas containing about 12% of $SO_2$.

INGENUIN HECHENBLEIKNER.